(12) United States Patent
John et al.

(10) Patent No.: US 8,818,684 B2
(45) Date of Patent: Aug. 26, 2014

(54) SYSTEMS, METHODS, AND APPARATUS FOR DETECTING FAILURE IN GAS TURBINE HARDWARE

(75) Inventors: Justin V. John, Schenectady, NY (US); Nirm Velumylum Nirmalan, Niskayuna, NY (US); John Charles Intile, Greenville, SC (US); Scott William Szepek, Schenectady, NY (US); Daniel Joseph Peczka, Schenectady, NY (US); Bradley Steven Carey, Greenville, SC (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 12/761,029

(22) Filed: Apr. 15, 2010

(65) Prior Publication Data

US 2011/0257864 A1    Oct. 20, 2011

(51) Int. Cl.
*G06F 19/00* (2011.01)

(52) U.S. Cl.
USPC ...... 701/100; 701/30.8; 701/31.4; 60/39.091; 60/779

(58) Field of Classification Search
USPC ............ 701/100, 30.8, 31.4; 60/39.01, 799, 60/39.091, 779, 805; 374/101, 100; 702/130, 132; 700/287
See application file for complete search history.

(56) References Cited

U.S. PATENT DOCUMENTS

| | | | | |
|---|---|---|---|---|
| 4,249,238 A * | 2/1981 | Spang et al. | ........... | 701/100 |
| 4,744,670 A * | 5/1988 | Janssen | ........... | 374/144 |
| 5,054,996 A * | 10/1991 | Carreno | ........... | 415/115 |
| 6,526,358 B1 * | 2/2003 | Mathews et al. | ........... | 702/51 |
| 6,579,005 B2 * | 6/2003 | Ingallinera | ........... | 374/45 |
| 7,603,222 B2 * | 10/2009 | Wiseman et al. | ........... | 701/100 |
| 7,734,443 B2 * | 6/2010 | De et al. | ........... | 702/132 |
| 7,743,599 B2 * | 6/2010 | Taware et al. | ........... | 60/39.091 |
| 8,192,688 B2 * | 6/2012 | Hagen et al. | ........... | 422/129 |
| 2002/0122458 A1 * | 9/2002 | Ingallinera | ........... | 374/45 |
| 2004/0093147 A1 * | 5/2004 | Kumar et al. | ........... | 701/100 |
| 2004/0148129 A1 | 7/2004 | Gotoh et al. | | |
| 2006/0042258 A1 * | 3/2006 | Gadde et al. | ........... | 60/772 |
| 2007/0078585 A1 * | 4/2007 | Pomeroy et al. | ........... | 701/100 |

(Continued)

OTHER PUBLICATIONS

Development of fuel failure detection system for a high temperature gas cooled reactor. IV; Katagiri, M.; Kishimoto, M.; Terada, H.; Wakayama, N.; Kawame, S.; Obata, M.; Ito, H.; Yoshida, H.; Kobayashi, F.; Nuclear Science, IEEE Transactions on vol. 37, Issue: 3, Part: 1-2; Digital Object ID: 10.1109/23.57393; Pub. Yr: 1990. pp. 1400-1404.*

(Continued)

*Primary Examiner* — Cuong H Nguyen
(74) *Attorney, Agent, or Firm* — Sutherland Asbill & Brennan LLP (57) ABSTRACT

Certain embodiments of the invention may include systems, methods, and apparatus for detecting failure in gas turbine hardware. According to an example embodiment of the invention, a method for detecting a failure in a gas turbine is provided. The method can include monitoring a parameter associated with the turbine, wherein the monitored parameter comprises at least one turbine bucket temperature, detecting an event associated with operation of the turbine, wherein the event is based at least in part on the monitored parameter, and initiating shutdown of the turbine upon detection of the event wherein the monitored parameter is above a predetermined value for at least a predetermined time duration.

17 Claims, 4 Drawing Sheets

(56) References Cited

U.S. PATENT DOCUMENTS

| | | | |
|---|---|---|---|
| 2007/0258807 A1 | 11/2007 | Brummel | |
| 2008/0010966 A1* | 1/2008 | Taware et al. | 60/39.27 |
| 2008/0276595 A1 | 11/2008 | Tanaka et al. | |
| 2009/0055070 A1* | 2/2009 | De et al. | 701/100 |
| 2009/0180939 A1* | 7/2009 | Hagen et al. | 422/194 |
| 2009/0228230 A1* | 9/2009 | Jammu et al. | 702/113 |
| 2011/0257864 A1* | 10/2011 | John et al. | 701/100 |

OTHER PUBLICATIONS

High temperature telemetry systems for in situ monitoring of gas turbine engine components; Keyes, B.; Brogan, J.; Gouldstone, C.; Greenlaw, R.; Jie Yang; Fraley, J.; Western, B.; Schupbach, M.; Aerospace conference, 2009 IEEE; Digital Object Identifier: 10.1109/Aero.2009.4839523; Publication Year: 2009, pp. 1-15.*

Turbine start-up algorithm based on prediction of rotor thermal stress; Nakai, A.; Nakamoto, M.; Kakehi, A.; Hayashi, S. SICE '95. Proceedings of the 34th SICE Annual Conference. International Session Papers Digital Object Identifier: 10.1109/SICE.1995.526968; Publication Year: 1995, pp. 1561-1564.*

Fault predictive diagnosis of wind turbine based on LM arithmetic of Artificial Neural Network theory; Lincang Ju; Dekuan Song; Beibei Shi; Qiang Zhao; Natural Computation (ICNC), 2011 Seventh International Conference on; vol. 1; Digital Object Identifier: 10.1109/ICNC.2011.6021921; Publication Year: 2011, pp. 575-579.*

Advances in structural damage diagnostic research: Architectural design, modeling and validation; Kumar, A.; Srivastava, A.; Goel, N.; Nayak, A.; Science and Technology for Humanity (TIC-STH), 2009 IEEE Toronto International Conference Digital Object Identifier: 10.1109/TIC-STH.2009.5444509; Publication Year: 2009, pp. 182-187.*

Model-based fault identification of power generation turbine engines using optimal pursuit; Jaw, L.; Van, H.T.; Aerospace Conference, 2004. Proceedings. 2004 IEEE; vol. 5; Digital Object Identifier: 10.1109/AERO.2004.1368156 Publication Year: 2004, pp. 3502-3506 vol. 5.*

High temperature telemetry systems for in situ monitoring of gas turbine engine components; Keyes, B.; Brogan, J.; Gouldstone, C.; Greenlaw, R.; Jie Yang; Fraley, J.; Western, B.; Schupbach, M.; Aerospace conference, 2009 IEEE Digital Object Identifier: 10.1109/AERO.2009.4839523; Publication Year: 2009, pp. 1-15.*

Sensor for gas analysis based on thermal conductivity, specific heat capacity and thermal diffusivity; Kliche, K.; Billat, S.; Hedrich, F.; Ziegler, C.; Zengerle, R.; Micro Electro Mechanical Systems (MEMS), 2011 IEEE 24th International Conference on Digital Object Identifier: 10.1109/MEMSYS.2011.5734644; Publication Year: 2011, pp. 11.*

Pressure Measurement Based on Thermocouples; Thomsen, K.; Nuclear Science, IEEE Transactions on vol. 57, Issue: 6, Part: 2; Digital Object Identifier: 10.1109/TNS.2010.2070077; Publication Year: 2010, pp. 3694-3700.*

Development of fuel failure detection system for a high temperature gas cooled reactor. III; Terada, H.; Asami, S.; Kishimoto, M.; Wakayama, N.; Obata, M.; Ogawa, T.; Kobayashi, F.; Fukuda, K.; Abe, H.; Yokouti, Y.; Yoshida, H.; Nuclear Science, IEEE Transactions on; vol. 36, Issue: 1, Part: 1; Dig Obj ID: 10.1109/23; pp. 1261-1264.*

A flexible and reliable embedded system for detector control in a high energy physics experiment; Krawutschke, T.; Field Programmable Logic and Applications, 2008. FPL 2008. International Conference on; Digital Object Identifier: 10.1109/FPL.2008.4629924; Publication Year: 2008, pp. 155-160.*

Search Report issued in connection with EP Patent Application No. 11161755.1, Mar. 19, 2012.

European Search Report dated Mar. 9, 2012 of Application No. EP 11 16 1755.

* cited by examiner

SYSTEMS, METHODS, AND APPARATUS FOR DETECTING FAILURE IN GAS TURBINE HARDWARE

FIELD OF THE INVENTION

This invention generally relates to gas turbines, and in particular, to detecting failure in gas turbine hardware.

BACKGROUND OF THE INVENTION

Gas turbines are typically large, complex machines with expensive parts that must withstand challenging environmental conditions. Building, maintaining, and operating these machines often requires a significant capital investment, and therefore, steps are often taken to ramp-up and ramp-down the turbines under careful control, in order to protect the capital investment, and operate the turbine within safe limits.

History has shown, however, that certain combustion failures can occur over a long period of time, and such failures may eventually result in catastrophic failure if they are not detected in time to ramp-down the turbine and perform corrective action. Furthermore, some failures may not be detectable in terms of usual monitoring parameters such as power output, grid frequency, or combustion modes.

BRIEF SUMMARY OF THE INVENTION

Some or all of the above needs may be addressed by certain embodiments of the invention. Certain embodiments of the invention may include systems, methods, and apparatus for detecting failure in gas turbine hardware.

According to an example embodiment of the invention, a method for detecting a failure in a gas turbine is provided. The method can include monitoring a parameter associated with the turbine, wherein the monitored parameter comprises at least one turbine bucket temperature, detecting an event associated with operation of the turbine, wherein the event is based at least in part on the monitored parameter, and initiating shutdown of the turbine upon detection of the event wherein the monitored parameter is above a predetermined value for at least a predetermined time duration.

According to another example embodiment, a system is provided for detecting failure. The system includes a gas turbine, at least one sensor for measuring a parameter associated with the turbine, wherein the parameter comprises at least one turbine bucket temperature. The system also includes at least one processor configured or programmed to receive and monitor the measured parameter from the at least one sensor, detect an event associated with operation of the turbine, wherein the event is based at least in part on the monitored parameter, and initiate shutdown of the turbine upon detection of the event wherein the monitored parameter is above a predetermined value for at least a predetermined time duration.

According to another example embodiment, an apparatus is provided for detecting failure in a turbine. The apparatus includes at least one processor configured to receive and monitor a measured parameter from at least one sensor, wherein the measured parameter comprises at least one turbine bucket temperature, detect an event associated with operation of the turbine, wherein the event is based at least in part on the monitored parameter, and initiate shutdown of the turbine upon detection of the event wherein the monitored parameter is above a predetermined value for at least a predetermined time duration.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Certain embodiments of the invention may enable automated hardware failure detection in a gas turbine. According to example embodiments, certain components in the hot gas path (HGP) of a turbine may be monitored to detect problems that could lead to a turbine failure.

Certain failure modes in a gas combustor can occur because of gradual failure or deterioration of components over hours, days, or weeks. According to example embodiments of the invention, systems, methods, and apparatus are provided to detect certain events that may be associated with an impending failure. In certain example embodiments, the event detection may be utilized to automatically shutdown a turbine. In accordance with certain embodiments, the detection and shutdown may limit further damage, and in certain cases, may eliminate a catastrophic (and expensive) turbine failure.

An example event that may correlate with a turbine failure (if left unchecked) is a combustor nozzle failure. For example, the combustor nozzle may be subjected to high temperatures and under certain conditions; a portion of the nozzle may begin to melt. This can create a relatively dangerous and sometimes hard to detect situation, which if left unchecked, could trigger extensive damage in other components in the hot gas path. For example, pieces of the failing nozzle may break off and damage other components such as rotating turbine blades or buckets, which may in turn break off and damage other components associated with the turbine. According to example embodiments pyrometers and other sensing devices, may be utilized to, for example, measure parameters such as bucket emissivity, acoustical energy, and/or exhaust NOx levels. According to example embodiments, monitoring and analysis of the measured parameter(s) may enable the control system to identify certain events and shut down the unit, thus preventing extensive damage. Certain embodiments of the invention may be applied to gas turbines and turbine systems for power generation applications. Embodiments of the invention may also be applied to turbines associated with engines, such as those used in aircraft and other vehicles.

According to example embodiments of the invention, various sensors, signal processors, pattern recognition modules, and controllers for detecting and responding to certain events associated with a failure will now be described with reference to the accompanying figures.

Figure 1:
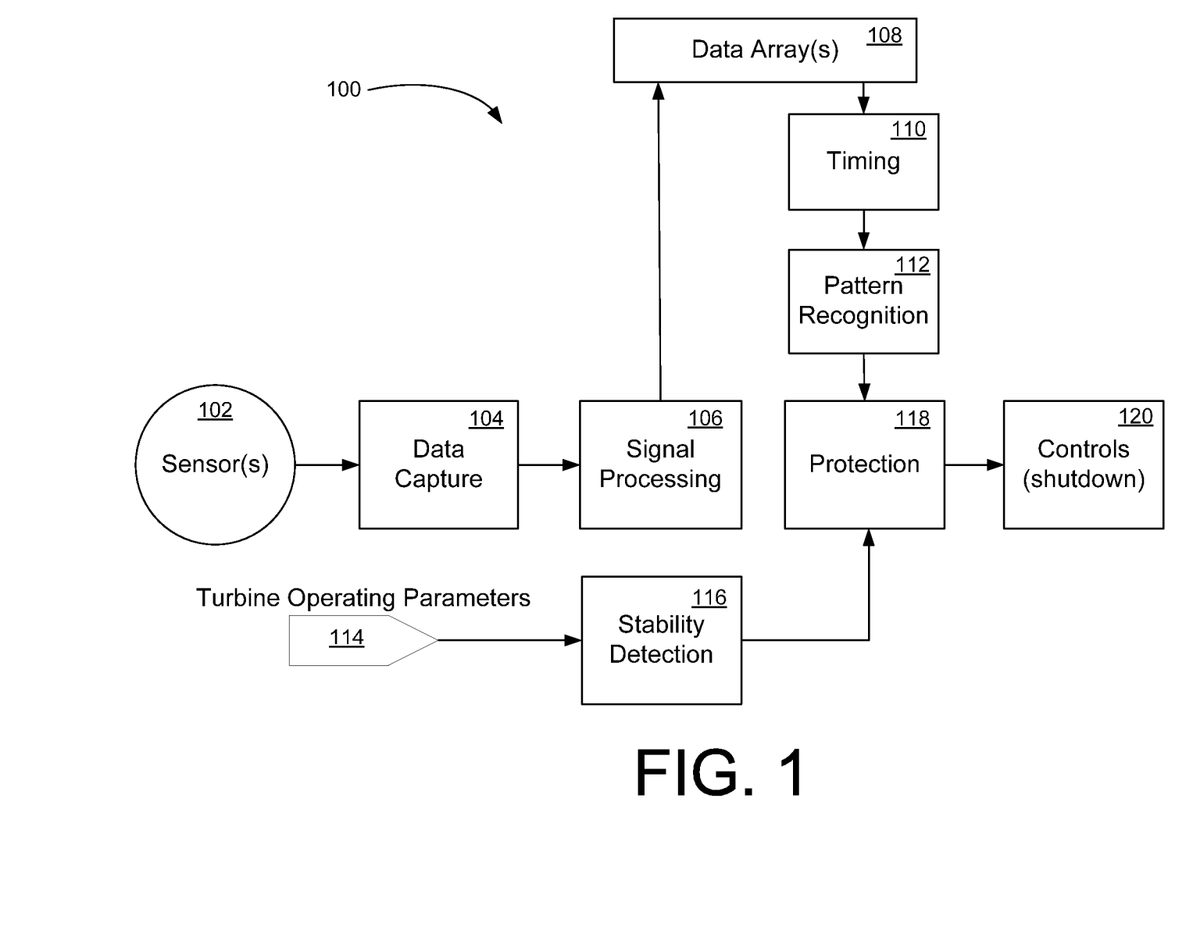
FIG. 1 is a block diagram of an illustrative automated gas turbine hardware failure detection system, according to an example embodiment of the invention.

FIG. 1 is a block diagram illustrating an example automated gas turbine hardware failure detection system 100, according to example embodiments of the invention. The system 100 may include one or more sensor(s) 102 for measuring parameters and events associated with the turbine. In an example embodiment, the sensors 102 may include pyrometer sensors, emissivity sensors, temperature sensors, gas sensors, cameras, acoustical sensors, etc. For example, and according to an example embodiment, one or more pyrometers may be positioned with respect to the upstream side row of turbine buckets so that they may measure temperature or emissivity from the rotating turbine buckets. In accordance with an example embodiment of the invention, melted material from a failing component (such as a nozzle) may collect on the bucket surface, and may cause a detectable change in the emissivity or temperature of the bucket surface.

According to an example embodiment of the invention, the automated gas turbine hardware failure detection system 100 may include one or more data capture modules 104 that may be configured to receive and condition the parameter information measured by the sensors 102. The data capture modules 104 may include analog to digital converters, level shifting, filtering, calibration, power supplies, etc., for proper communication with the sensors 102 and/or for conditioning the signals that are received from the sensors 102.

According to an example embodiment, the data capture module(s) 104 may communicate with a signal-processing module 106. In an example embodiment the signal-processing module 106 may further process the information received from the sensor(s) 102 via the data capture module(s) 104. For example, the signal-processing module 106 may average or filter the incoming data. In certain embodiments, the signal-processing module 106 may scale and/or format the data for storage in a data array 108.

In an example embodiment, the data stored in the data array(s) 108 may be utilized by the timing module 110, and/or the pattern recognition module 112 to detect changes in the various incoming parameters and to identify certain time-dependent events associated with the turbine that may indicative of failure modes. For example, in an embodiment of the invention, the pattern recognition module 112 may be configured to, or programmed to analyze information in the data array(s) 108. In another example embodiment, the pattern recognition module 112 may be configured to utilize information from the timing module 110 for analyzing measurement data as a function of time. Additional examples involving the pattern recognition aspect of the invention will be further discussed with reference to FIG. 2 below.

In certain example embodiments of the invention, some of the various operational modes of the gas turbine may be more suitable than others for determining events associated with possible failure. For example, when the turbine is being ramped-up, the measurable parameters (temperature, exhaust gases, airflow, fuel flow, etc.) may be fluctuating normally, but may cause a false alarm or shutdown of the system. Therefore, according to an aspect of one embodiment of the invention, a stability detection 116 module may monitor turbine operating parameters 114 to enable a protection module 118 only after certain operating criteria are met. For example, the stability detection module 116 may monitor turbine operating parameters 114 to determine if the turbine has reached steady state operation, and/or if other criteria are met. In accordance with an example embodiment of the invention, the stability detection module 116 may inhibit the protection module 118 and keep it from initiating a shutdown of the system via the turbine controls 120 until after the stability criteria are met, and certain event criteria have been met. For example, shutdown may be initiated upon detection of the event and after fuel flow or airflow associated with the turbine has initialized or stabilized.

According to an example embodiment of the invention, a change in temperature or emissivity of the turbine buckets may signal an event that (either alone or combined with other events, such as changes in the detected NOx level, or changes in the combustion acoustic properties, for example) may be utilized to determine a possible impending failure so that preemptive action can be taken.

Figure 2:
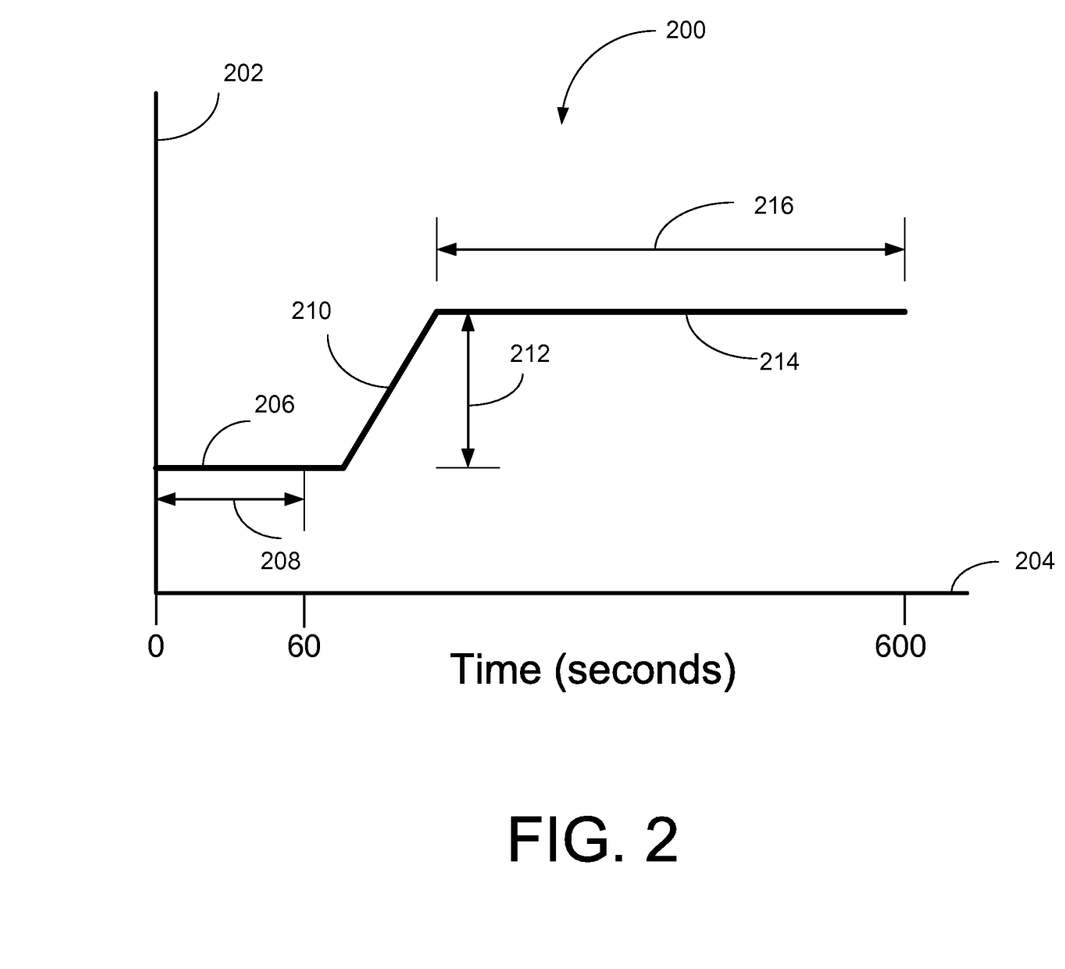
FIG. 2 is an example graph illustrative of combustion event timing, according to an example embodiment of the invention.

FIG. 2 depicts an illustrative graph of example combustion event timing according to an example embodiment of the invention. This graph 200 shows an example sensor response 202 as a function of time 204. The sensor output may be in response to temperature or some other measured parameter associated with the turbine. In an example embodiment, the sensor may output a certain initialization response 206 over an initialization period 208. In an example embodiment of the invention, and as described above, the stability detection aspect of the invention (such as 116 in FIG. 1), may disable the protection and/or shutdown features (such as 118 and 120 respectively in FIG. 1) until after the initialization period 208.

According to an example embodiment of the invention, the one or more sensors may sense parameter changes (such as rising temperature, changing NOx, etc.). The automated gas turbine hardware failure detection system (such as 100 in FIG. 1) may then analyze and classify the changing parameter as an event 210, provided that certain criteria are met. For example, an event may be classified by amplitude 212, sustained level 214, and/or sustained time 216. In accordance with certain example embodiments of the invention, monitoring a parameter associated with the turbine may include determining a moving average of the parameter over at least one time duration. In an example embodiment, an event that may trigger a shutdown after stabilization is a measured temperature increase in a turbine bucket of greater than about 5 degrees Fahrenheit over less than about 10 minutes. According to another example embodiment, an event that may trigger a shutdown after stabilization is an exhaust NOx increase of greater than about 2 ppm (parts per million) over less than about 10 minutes.

According to example embodiments of the invention, shutdown of the turbine may be initiated when an event has been detected and a difference between the current monitored parameter and a stored past monitored parameter is sustained above about 25% of a limit associated with the event for greater than about 1 minute.

Figure 3:
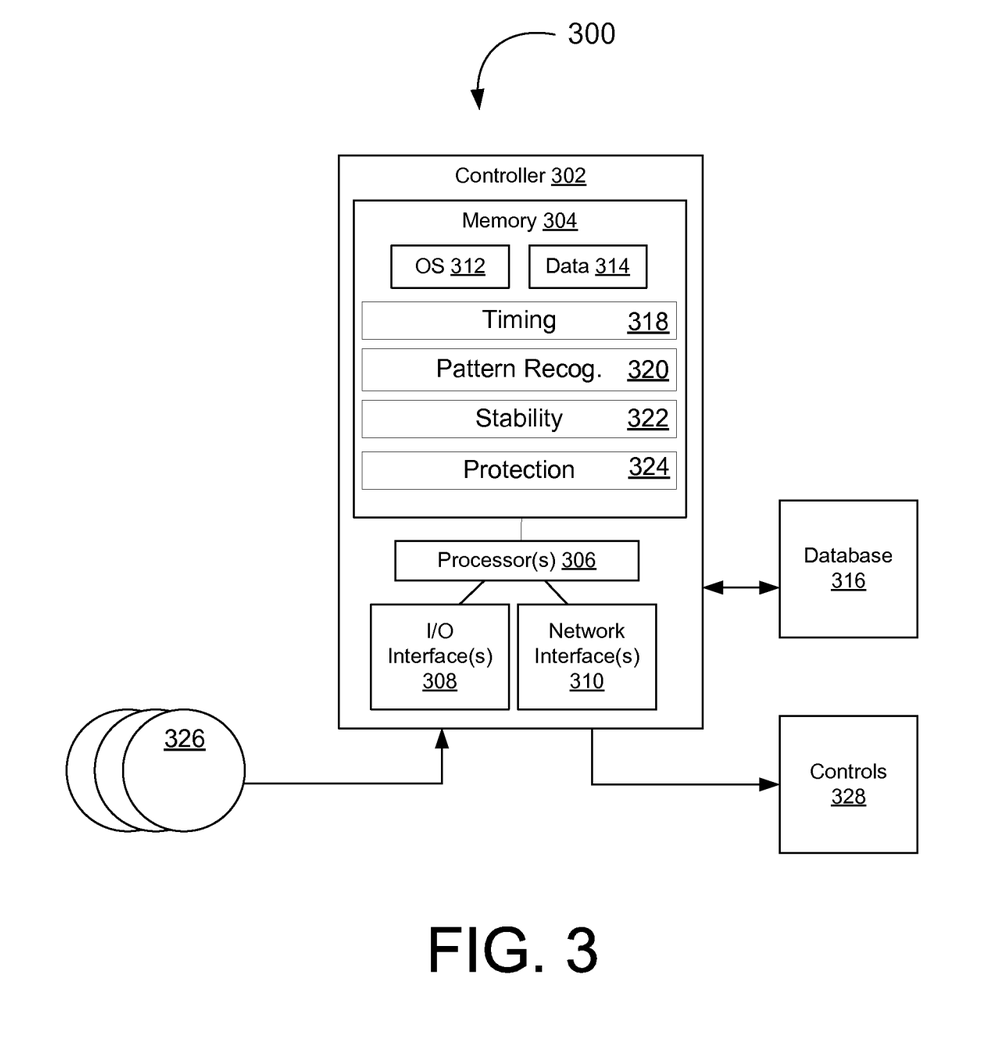
FIG. 3 is a block diagram of an automated gas turbine hardware failure detection control system, according to an example embodiment of the invention.

FIG. 3 depicts a block diagram of an automated gas turbine hardware failure detection control system 300, according to an example embodiment of the invention. According to an example embodiment, the system 300 may include a controller 302, which may include a memory 304, one or more processors 306, and input/output (I/O) interfaces 308. In certain example embodiments, the controller 302 may include one or more network interfaces 310. In an example embodiment, the memory 304 may include an operating system (OS) 312, data 314, and various special purpose modules. The data 314 may include data arrays, such as 108 in FIG. 1. According to an example embodiment, the control system 300 may include a database 316 for data storage and retrieval.

In an example embodiment, the memory 304 may include a timing module, such as 110 in FIG. 1, configured or programmed to carry out operations including time stamping, formatting data 314, and performing operations relating to time functions. In certain embodiments, a clock may be utilized in the timing module 318, similar to 110 in FIG. 1. According to an example embodiment, the memory 304 may also include a pattern recognition module 320, similar to 112 in FIG. 1. This module may be configured or programmed to detect changes in the various incoming parameters 326 and to identify certain time-dependent events associated with the turbine that may be indicative of failure modes. For example, in an embodiment of the invention, the pattern recognition module 320 may be configured to, or programmed to, analyze information in the data array(s) 108. In another example embodiment, the pattern recognition module 320 may be configured to utilize information from the timing module 318 for analyzing measurement data as a function of time. In certain embodiments of the invention, the pattern recognition module 320 may carry out functions, as described with reference to FIG. 2. For example, the pattern recognition module 320 may analyze and classify changing parameters as an event if certain criteria are met.

According to an example embodiment, and with continued reference to FIG. 3, the memory 304 may include a protection module 324, which can be similar to 118 in FIG. 1. The protection module 324 may receive information from the pattern recognition module 112, and may utilize this information in conjunction with instructions from a stability module 322, which can be similar to 116 in FIG. 1, to initiate shutdown of the turbine when certain event criteria are met. For example, the stability module 322 may monitor turbine operating parameters, such as 114 in FIG. 1, to determine if the turbine has reached steady state operation, and/or if other criteria are met. In accordance with an example embodiment of the invention, the stability module 322 may inhibit the protection module 324 and keep it from initiating a shutdown of the system via the turbine controls 328, similar to 120 in FIG. 1, until after the stability criteria are met, and certain event criteria have been met. For example, shutdown may be initiated upon detection of the event and after fuel flow or airflow associated with the turbine has initialized or stabilized.

Figure 4:
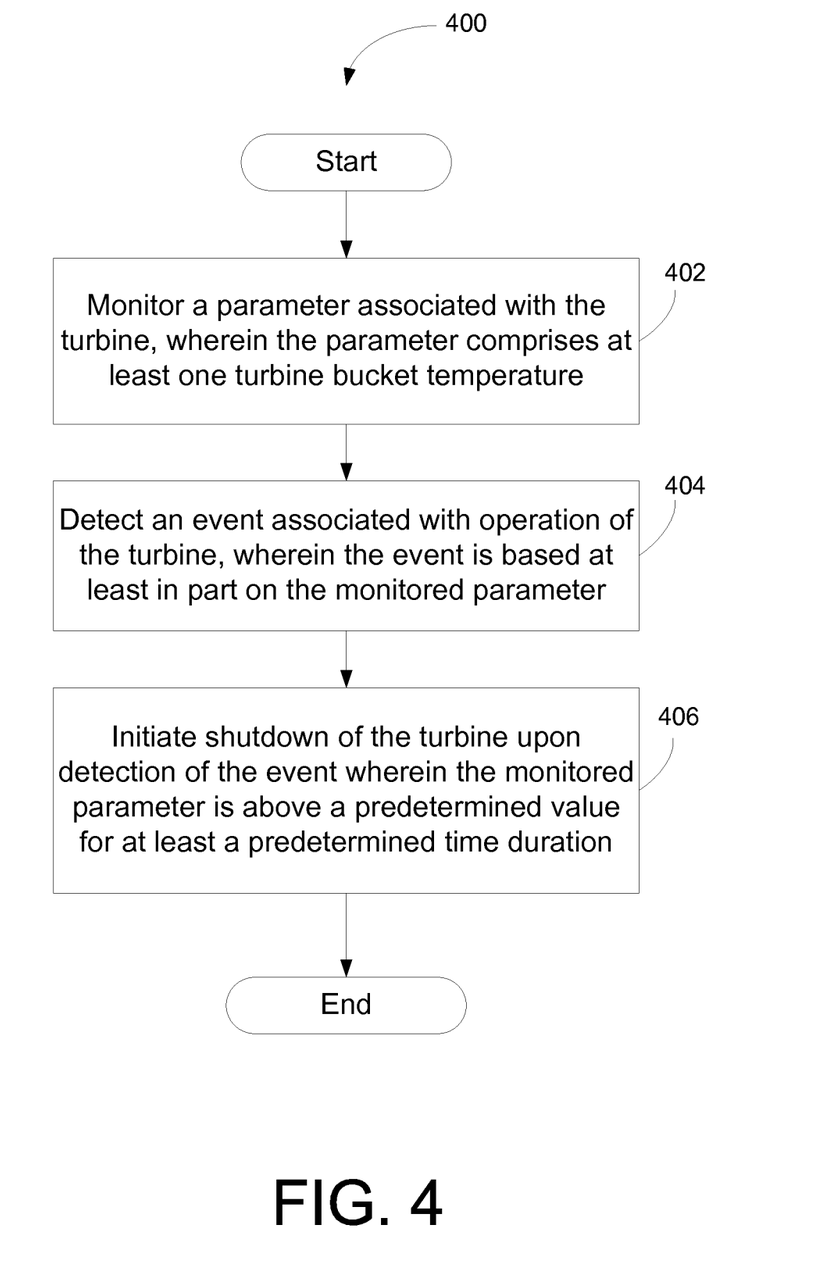
FIG. 4 is a flow diagram of an example method according to an example embodiment of the invention.

An example method for detecting a failure in a gas turbine will now be described with reference to the flow diagram of FIG. 4. The method 400 starts in block 402, where according to an example embodiment of the invention, the method 400 includes monitoring a parameter associated with the turbine, wherein the parameter comprises at least one turbine bucket temperature. In block 404, the method 400 includes detecting an event associated with operation of the turbine, wherein the event is based at least in part on the monitored parameter. In block 406, the method 400 includes initiating shutdown of the turbine upon detection of the event wherein the monitored parameter is above a predetermined value for at least a predetermined time duration. The method 400 ends after block 406.

Accordingly, example embodiments of the invention can provide the technical effects of creating certain systems, methods, and apparatus that provide detection of events associated with a turbine. Example embodiments of the invention can provide the further technical effects of providing systems, methods, and apparatus for classifying the detected events as being associated with a failure mode or a probable failure mode associated with the turbine. Example embodiments of the invention can provide the further technical effects of providing systems, methods, and apparatus for initiating automatic shutdown of a turbine if certain events are detected, thereby preempting further damage in the turbine, and in some cases, avoiding catastrophic failure of turbine.

In example embodiments of the invention, the automated gas turbine hardware failure detection system 100 and/or the automated gas turbine hardware failure detection control system 300 may include any number of hardware and/or software applications that are executed to facilitate any of the operations.

In example embodiments, one or more I/O interfaces may facilitate communication between the automated gas turbine hardware failure detection system 100 and/or the automated gas turbine hardware failure detection control system 300, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the automated gas turbine hardware failure detection system 100 and/or the automated gas turbine hardware failure detection control system 300. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the automated gas turbine hardware failure detection system 100 and/or the automated gas turbine hardware failure detection control system 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the automated gas turbine hardware failure detection system 100 and/or the automated gas turbine hardware failure detection control system 300 with more or less of the components illustrated in FIGS. 1 and 3.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for detecting a failure in a gas turbine comprising:
monitoring a parameter associated with the turbine from at least one sensor, wherein the monitored parameter comprises at least one turbine bucket temperature;
determining that the turbine is associated with an operational mode suitable for detecting events associated with turbine failures based at least in part on the monitored parameter;
detecting, in response to determining that the turbine is associated with the operational mode, an event associated with the operation of the turbine based at least in part on the monitored parameter being above a predetermined value for at least a predetermined time duration; and
initiating shutdown of the turbine upon detection of the event wherein initiating is performed upon detection of the event and after a fuel flow or airflow associated with the turbine has stabilized.

2. The method of claim 1, wherein the monitored parameter associated with the turbine combustor further comprises at least one of: bucket emissivity, acoustical energy, or exhaust NOx level.

3. An apparatus for detecting failure in a turbine comprising:
at least one processor configured to:
receive and monitor a measured parameter from at least one sensor, wherein the measured parameter comprises at least one turbine bucket temperature;
determine that the turbine is in a suitable operational mode for detecting events associated with the possible turbine failures based at least in part on the measured parameter;
detect an event associated with operation of the turbine, in response to determining the turbine is in the suitable operational mode, wherein the event is based at least in part on the at least one turbine bucket temperature being above a predetermined value for at least a predetermined time duration; and
initiating shutdown of the turbine upon detection of the event and after a fuel flow or an airflow associated with the turbine has stabilized.

4. The method of claim 1, wherein monitoring a parameter associated with the turbine comprises determining a moving average of the parameter over at least one time duration.

5. The method of claim 1, wherein an event comprises a turbine bucket temperature increase of greater than about 5 degrees Fahrenheit over less than about 10 minutes.

6. The method of claim 1, wherein an event comprises an exhaust NOx increase of greater than about 2 ppm over less than about 1 minute.

7. The method of claim 1, wherein initiating shutdown of the turbine occurs when an event has been detected and a difference between the current monitored parameter and a stored past monitored parameter is sustained above about 25% of a limit associated with the event for greater than about 5 seconds.

8. A system for detecting failure comprising:
a gas turbine;
at least one sensor for measuring a parameter associated with the turbine, wherein the measured parameter comprises at least one turbine bucket temperature;
at least one processor configured to:
determine that the turbine is in a suitable operational mode for detecting events associated with possible turbine failures based at least in part on the measured parameter;
receive and monitor the measured parameter from the at least one sensor in response to determining the turbine is in the suitable operational mode;
detect an event associated with operation of the turbine, wherein the event is based at least in part on the monitored parameter being above a predetermined value for at least a predetermined time duration; and
initiate shutdown of the turbine upon detection of the event and after a fuel flow or an airflow associated with the turbine has stabilized.

9. The system of claim 8, wherein the at least one sensor is further operable to measure one or more of bucket emissivity, acoustical energy, or exhaust NOx level.

10. The apparatus of claim 3, wherein initiating shutdown of the turbine occurs when an event has been detected and a difference between the current monitored parameter and a stored past monitored parameter is sustained above about 25% of a limit associated with the event for greater than about 5 seconds.

11. The system of claim 8, wherein the at least one processor is configured for receiving and monitoring from the at least one sensor, the measured parameter associated with the turbine, wherein monitoring comprises determining a moving average of the measured parameter over at least one time duration.

12. The system of claim 8, wherein an event comprises a turbine bucket temperature increase of greater than about 5 degrees Fahrenheit over less than about 10 minutes.

13. The system of claim 8, wherein an event comprises an exhaust NOx increase of greater than about 2 ppm over less than about 1 minute.

14. The system of claim 8, wherein initiating shutdown of the turbine occurs when an event has been detected and a difference between the current monitored parameter and a stored past monitored parameter is sustained above about 25% of a limit associated with the event for greater than about 5 seconds.

15. The apparatus of claim 3, wherein the at least one processor is further configured to detect an event associated with the operation of the turbine, wherein an event comprises a turbine bucket temperature increase of greater than about 5 degrees Fahrenheit over less than about 10 minutes or an exhaust NOx increase of greater than about 2 ppm over less than about 1 minute.

16. The apparatus of claim 3, wherein the at least one processor is configured to receive and monitor a measured parameter from the at least one sensor, wherein the measured parameter further comprises one or more of: bucket emissivity, acoustical energy, or exhaust NOx level.

17. The apparatus of claim 3, wherein the at least one processor is configured for receiving and monitoring from the at least one sensor, the measured parameter associated with the turbine, wherein monitoring comprises determining a moving average of the measured parameter over at least one time duration.

* * * * *